United States Patent
Hamlin

(10) Patent No.: US 6,799,274 B1
(45) Date of Patent: Sep. 28, 2004

(54) DEVICE COMPRISING ENCRYPTION CIRCUITRY ENABLED BY COMPARING AN OPERATING SPECTRAL SIGNATURE TO AN INITIAL SPECTRAL SIGNATURE

(75) Inventor: Christopher L. Hamlin, Los Gatos, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 0 days.

(21) Appl. No.: 09/539,514

(22) Filed: Mar. 30, 2000

(51) Int. Cl.[7] .................................................. H04L 9/00
(52) U.S. Cl. .................... 713/176; 713/164; 713/160
(58) Field of Search ............................. 713/176, 186, 713/194, 189; 324/536; 382/232; 380/2

(56) References Cited

U.S. PATENT DOCUMENTS

| | | | |
|---|---|---|---|
| 4,776,010 A | * | 10/1988 | Noda et al. ................. 725/107 |
| 5,162,723 A | * | 11/1992 | Marzalek et al. ........ 324/76.19 |
| 5,214,702 A | * | 5/1993 | Fischer ....................... 380/30 |
| 5,254,843 A | | 10/1993 | Hynes et al. |
| 5,365,591 A | * | 11/1994 | Carswell et al. ............ 713/164 |
| 5,616,904 A | | 4/1997 | Fernadez |
| 5,821,870 A | | 10/1998 | Jackson, Jr. |
| 5,848,108 A | * | 12/1998 | Tong et al. ................. 375/350 |
| 5,889,868 A | | 3/1999 | Moskowitz et al. |
| 5,917,909 A | * | 6/1999 | Lamla ......................... 705/67 |
| 5,920,628 A | | 7/1999 | Indeck et al. |
| 6,363,479 B1 | * | 3/2002 | Godfrey et al. ............ 713/160 |

\* cited by examiner

Primary Examiner—Ayaz Sheikh
Assistant Examiner—A. Sherakat
(74) Attorney, Agent, or Firm—Milad G. Shara, Esq.; Howard Sheerin, Esq.

(57) ABSTRACT

A device is disclosed comprising encryption circuitry for encrypting plaintext data into ciphertext data. A memory stores an initial spectral signature representing an initial spectral characteristic of the device, and a signal generator for generating an operating spectral signature representing an operating spectral characteristic of the device. A comparator compares the operating spectral signature to the initial spectral signature and enables the encryption circuitry if the operating spectral characteristic substantially matches the initial spectral characteristic.

24 Claims, 6 Drawing Sheets

DEVICE COMPRISING ENCRYPTION CIRCUITRY ENABLED BY COMPARING AN OPERATING SPECTRAL SIGNATURE TO AN INITIAL SPECTRAL SIGNATURE

BACKGROUND OF THE INVENTION

1. Field of the Invention

The present invention relates to encryption circuitry. More particularly, the present invention relates to encryption circuitry enabled by comparing an operating spectral signature to an initial spectral signature.

2. Description of the Prior Art

Cryptosystems are typically secure as long as attackers cannot discover the secret keys used to encrypt and decrypt messages. Attackers use various cryptanalysis techniques to analyze a cryptosystem in an attempt to discover the secret keys, where the difficulty in discovering the secret keys generally depends on the amount of information available. The cryptosystem typically employs a public encryption algorithm (such as RSA, DES, etc.), therefore an attacker typically knows the encryption algorithm and has access to ciphertext (encrypted text). However, it is usually very difficult to discover the secret keys with this information alone because an attacker typically needs to perform various operations on the ciphertext with respect to the original plaintext (unencrypted text). A known cryptanalysis technique includes monitoring a cryptosystem to capture plaintext before it is encrypted so that it can be analyzed together with the ciphertext. Another cryptanalysis technique includes performing a chosen plaintext attack by choosing the plaintext that is to be encrypted so as to expose vulnerabilities of a cryptosystem because the attacker can deliberately pick patterns helpful to analysis contributing to discovering the secret keys. This type of an attack can be defended against by requiring the individual clients accessing the cryptosystem to be authenticated. However, an attacker with direct access to a cryptosystem may attempt to circumvent such a requirement by tampering with the cryptosystem. Examples of tampering include inspecting, altering or replacing a component of the cryptosystem in order to force the encryption operation.

There is, therefore, a need to validate a cryptosystem before enabling an encryption operation so as to protect the encryption keys from chosen plain text attacks.

SUMMARY OF THE INVENTION

The present invention may be regarded as a device comprising encryption circuitry for encrypting plaintext data into ciphertext data. A memory stores an initial spectral signature representing an initial spectral characteristic of the device, and a signal generator for generating an operating spectral signature representing an operating spectral characteristic of the device. A comparator compares the operating spectral signature to the initial spectral signature and enables the encryption circuitry if the operating spectral characteristic substantially matches the initial spectral characteristic.

The present invention may also be regarded as a method of enabling encryption circuitry within a device, the encryption circuitry for encrypting plaintext data into ciphertext data. The method comprises the steps of storing in a memory an initial spectral signature representing an initial spectral characteristic of the device and generating an operating spectral signature representing an operating spectral characteristic of the device. The operating spectral signature is compared to the initial spectral signature, and the encryption circuitry is enabled if the operating spectral characteristic substantially matches the initial spectral characteristic.

DESCRIPTION OF THE PREFERRED EMBODIMENTS

Figure 1:
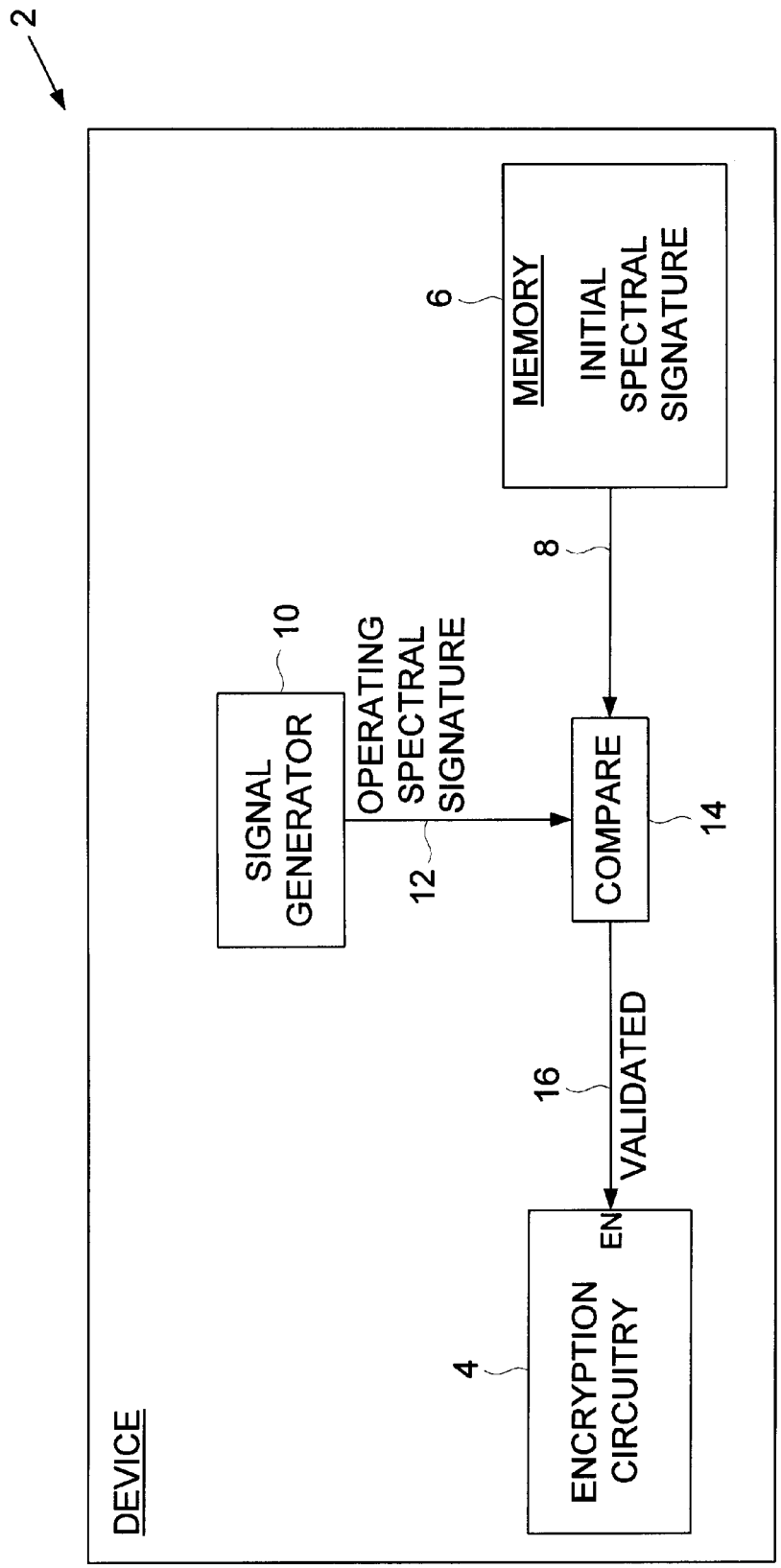
FIG. 1 shows a device according to an embodiment of the present invention comprising encryption circuitry for encrypting plaintext data into ciphertext data, wherein the encryption circuitry is enabled by a validation circuit which compares an operating spectral signature to an initial spectral signature of the device.

FIG. 1 shows a device 2 according to an embodiment of the present invention comprising encryption circuitry 4 for encrypting plaintext data into ciphertext data. A memory 6 stores an initial spectral signature 8 representing an initial spectral characteristic of the device 2, and a signal generator 10 generates an operating spectral signature 12 representing an operating spectral characteristic of the device 2. A comparator 14 compares the operating spectral signature 12 to the initial spectral signature 8, and enables the encryption circuitry 4 by activating an enable signal 16 if the operating spectral characteristic substantially matches the initial spectral characteristic.

The initial spectral signature 8 may be generated and stored in the memory 6 during manufacturing of the device 2. The signal generator 10 then generates the operating spectral signature 12 during normal operation of the device 2 in order to enable the encryption circuitry 4 to encrypt the plaintext data into the ciphertext data. This protects against chosen plaintext attacks by validating the device 2 before allowing an encryption operation to occur. Attempts to force the encryption circuitry 4 to encrypt chosen plaintext, such as an attacker tampering with the device 2, will likely invalidate the device 2 by changing the operating spectral signature 12. Once the device 2 is invalidated, the encryption circuitry 4 is permanently disabled.

The initial spectral signature 8 may be generated during manufacture of the device 2 using external test equipment (e.g., oscilloscopes, spectrum analyzers, etc.) which may provide a more accurate measurement of the initial spectral characteristic. The signal generator 10 can also be calibrated during manufacturing in order to match the operating spectral signature 12 to the initial spectral signature 8 generated using the external test equipment. In an alternative embodiment, the initial spectral signature 8 is generated internally using the signal generator 10 and then stored in the memory 6. This embodiment may be less accurate but more efficient and cost effective since it obviates the expensive external test equipment used to generate the initial spectral signature 8, as well as the need to calibrate the signal generator 10. Further, in an embodiment of the present invention disclosed below with reference to FIG. 5, the initial spectral signature 8 is generated by evaluating a user authentication signal provided by a user of the device 2. Thus, this embodiment requires the signal generator 10 to generate the initial spectral signature 8 rather than using external test equipment.

The initial spectral signature 8 is generated in a protected environment so that it is not compromised. For example, it may be generated in a secure manufacturing environment or it may be generated by the user in a secure manner before exposing the device to a public environment, such as connecting the device to a public network. Further, suitable measures are employed to protect the initial spectral signature 8 from discovery once it has been stored in the memory 6. For example, the initial spectral signature 8 may be encrypted using a suitable encryption algorithm. In addition, suitable measures are employed to protect the initial spectral signature 8 from being inspected or altered without rendering the device inoperable. For example, the memory 6 may be implemented using tamper resistant integrated circuitry and/or an authentication code may be employed to verify that the initial spectral signature 8 has not been altered. The comparator 14 is also implemented so as to prevent an attacker from inappropriately fabricating the validation signal 16 in an attempt to enable the encryption circuit 4. For example, the validation signal 16 may be buried in a multi-layer circuit board or in tamper resistant integrated circuitry, or the impedance of the validation signal 16 may be monitored to detect an attacker tampering with the validation signal 16. If the device 2 detects an attacker tampering with either the initial spectral signature 8 or the validation signal 16, the encryption circuit 4 is rendered inoperable (e.g., blowing a fuse). In one embodiment, the device may be returned to the manufacturer for restoration to normal operation, the restoration taking place in a secure manufacturing environment.

Figure 2:
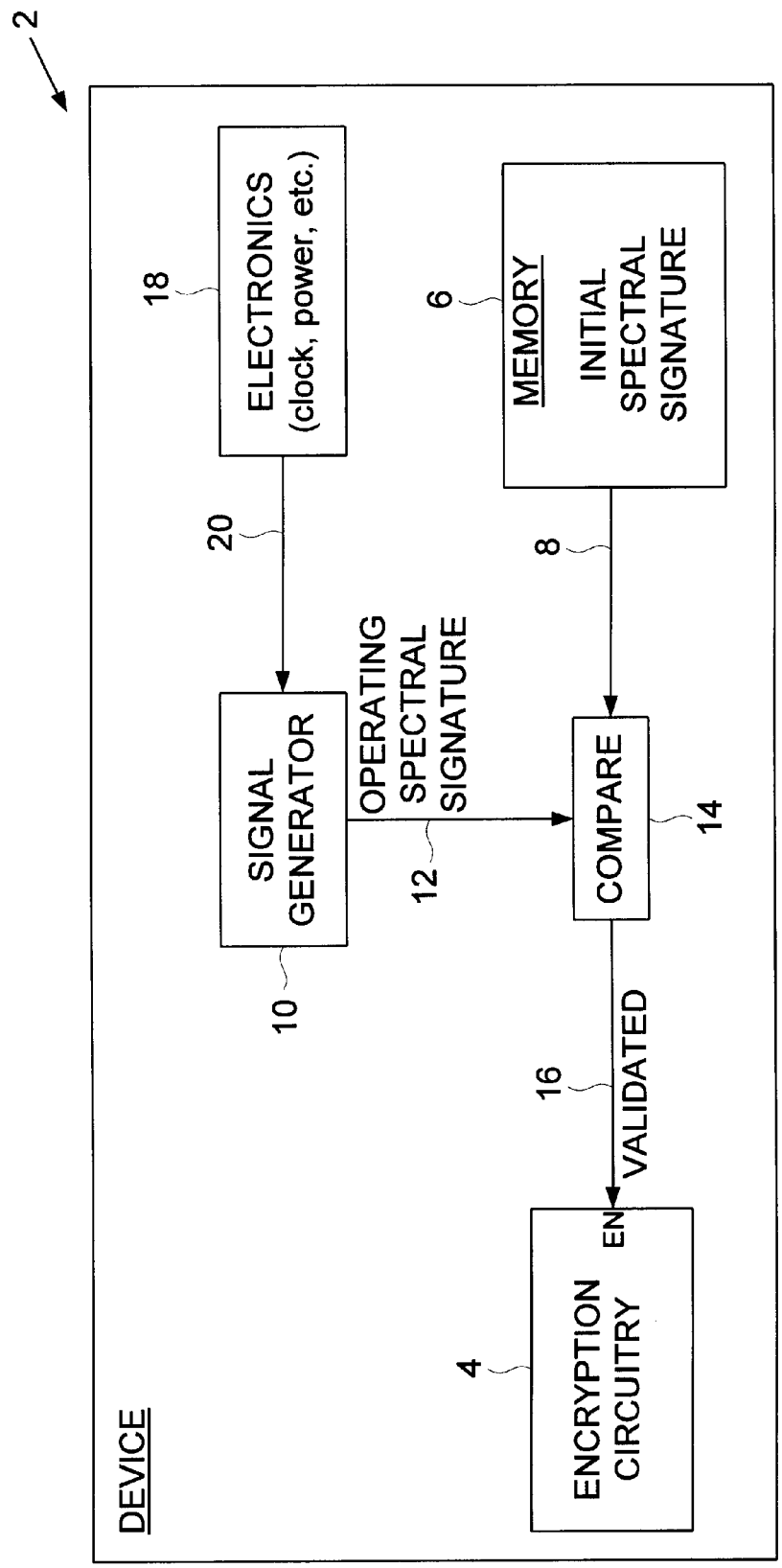
FIG. 2 shows an embodiment of the present invention wherein the initial and operating spectral signatures are generated by measuring a spectral characteristic of an analog signal generated by an electronic circuit (e.g., a clock, power supply, etc.) within the device.

FIG. 2 shows an embodiment of the present invention wherein the device 2 further comprises an electronic circuit 18. The initial and operating spectral signatures are generated by measuring a spectral characteristic of an analog signal 20 generated by the electronic circuit 18. The electronic circuit 18 may be, for example, a clock generator for generating a clock signal 20 used to clock operation of the device 2. The measured spectral characteristic may be, for example, a frequency or jitter characteristic of the clock signal 20, or the convolution of such signals. Attempts to tamper with the device 2 which alter the measured spectral characteristic of the clock signal 20 will disable the encryption circuitry 4 and prevent chosen plaintext attacks. In an alternative embodiment, the electronic circuit 18 is a power supply for generating a power signal 20 for powering the device 2. The measured spectral characteristic may be, for example, a DC component of the power signal 20 or a RMS of the noise in the power signal 20, or the convolution of such signals. Tampering or probing the device 2 may change the spectral characteristic of the power signal 20 which will disable the encryption circuitry 4 and prevent chosen plaintext attacks.

Figure 3:
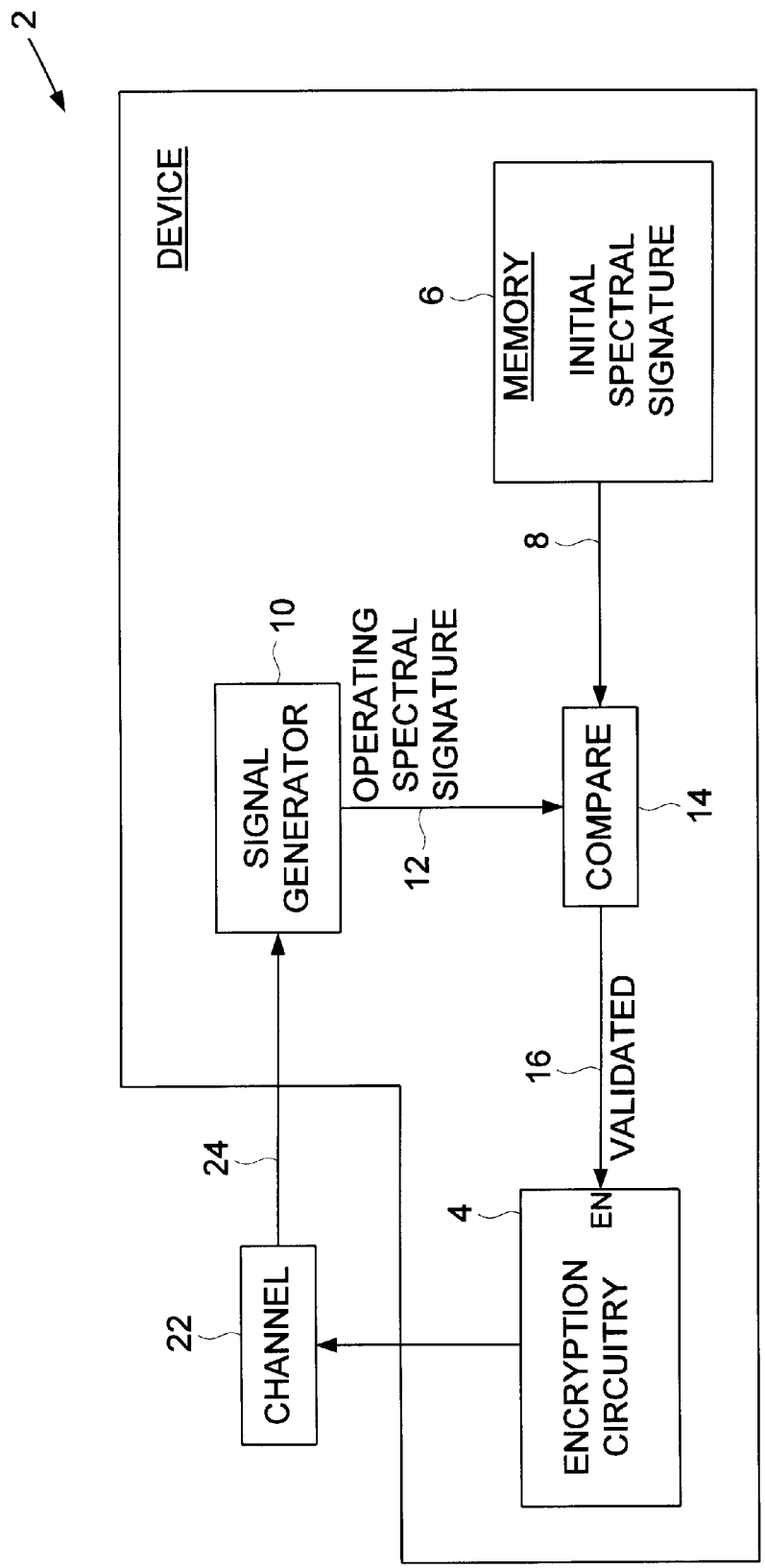
FIG. 3 shows an embodiment of the present invention wherein the cipher text is output to a channel and the initial and operating spectral signatures are generated by measuring a spectral characteristic of an analog signal generated by the channel.

FIG. 3 shows an alternative embodiment of the present invention wherein the ciphertext generated by the encryption circuitry 4 is output to a channel 22. The channel 22 may be, for example, a communication channel, such as in wired or cellular communications, or it may be a storage medium such as in the disk storage medium of a disk drive. The initial and operating spectral signatures are generated by measuring a spectral characteristic of an analog signal 24 generated by the channel 22. For example, the spectral characteristic may be an impedance value of a communication wire, wherein attempts to monitor or tamper with the communication wire will change the impedance value and therefore change the spectral characteristic of the analog signal 24. In the embodiment wherein the channel is a storage medium, such as a disk storage medium, the spectral characteristic may be related to recorded data. For example, a spectral characteristic may be derived from timing information associated with recorded data, such as zero crossing or jitter information. Attempts to tamper or replace the storage medium will alter the spectral characteristic of the recorded data, thereby disabling the encryption circuitry 4 and preventing chosen plaintext attacks. Alternatively, a spectral characteristic may be derived from mechanical properties of the disk drive, for example, repeatable runout (RRO) due to eccentricities of the disk storage medium, or natural resonance frequencies of components such as the disk drive actuator assembly.

Figure 4:
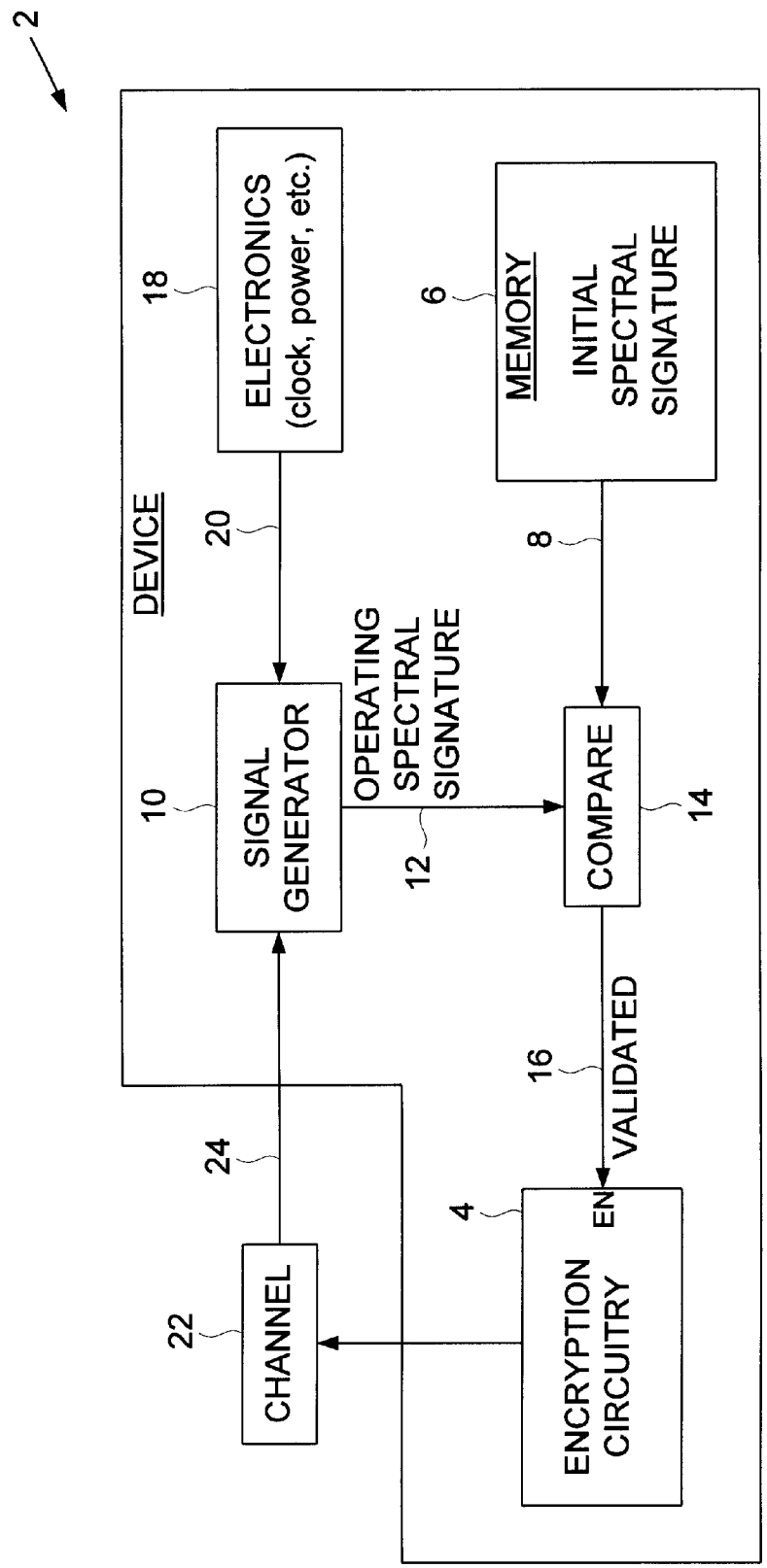
FIG. 4 shows an embodiment of the present invention wherein the initial and operating spectral signatures are generated by measuring a first spectral characteristic of a first analog signal generated by an electronic circuit and a second spectral characteristic of an analog signal generated channel.

FIG. 4 shows an alternative embodiment of the present invention wherein the signal generator 10 generates the initial and operating spectral signatures by measuring a first spectral characteristic of a first analog signal 20 generated by an electronic circuit 18, and by measuring a second spectral characteristic of a second analog signal 24 generated by a channel 22. The spectral characteristics of each signal may be measured individually to generate the initial and operating spectral signatures, or the signals may be combined (e.g., convolved) and the combined signal used to generate the initial and operating spectral signatures.

Figure 5:
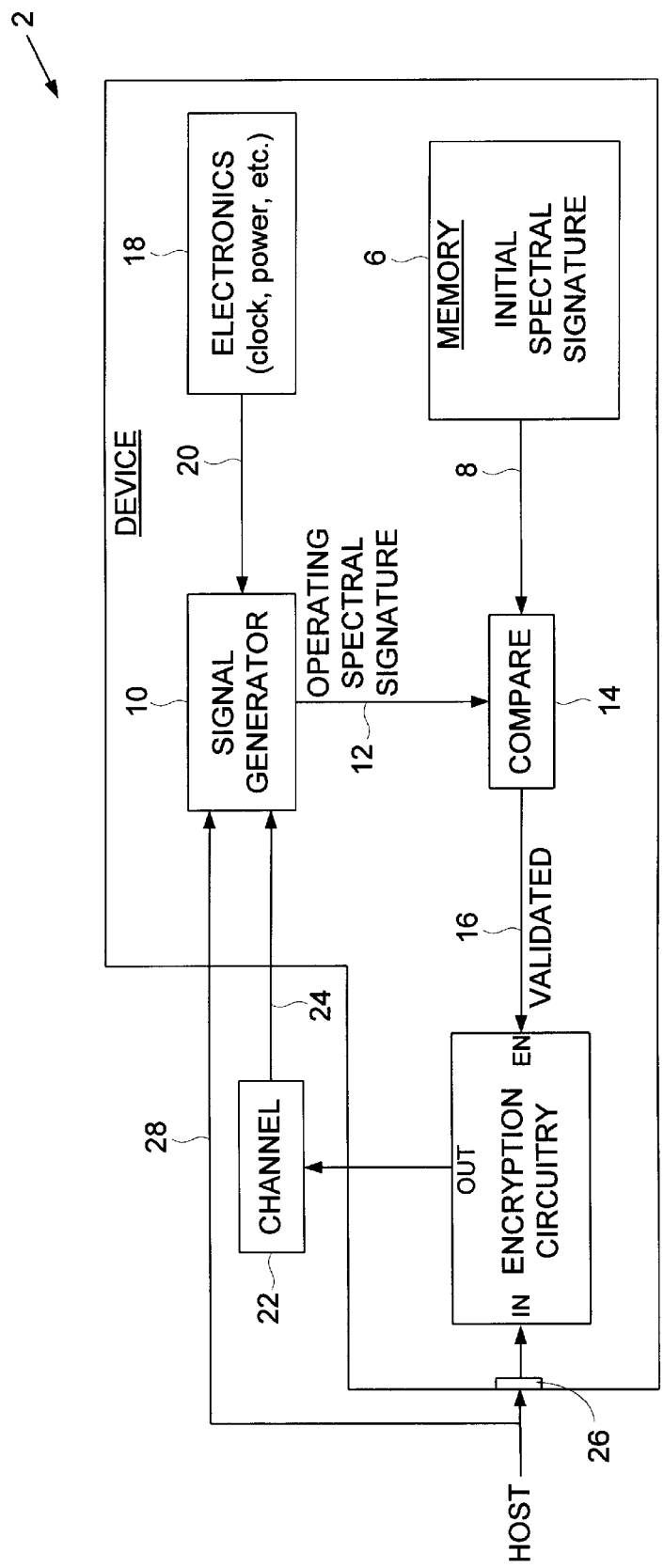
FIG. 5 shows an embodiment of the present invention wherein the device comprises an input for receiving the plaintext data from a host system, and the initial and operating spectral signatures are generated by combining the spectral characteristic of the analog signal generated by the electronic circuit or the channel with a user authentication signal provided by the host.

FIG. 5 shows an alternative embodiment of the present invention wherein the device 2 comprises an input 26 for receiving the plaintext data from a host system, and the initial and operating spectral signatures are generated by combining the spectral characteristic of the analog signal 20 generated by the electronic circuit 18 with a user authentication signal 28 provided by the host. The user authentication signal 28 may be generated, for example, by a voice or retinal scan of a user operating the device 2. The spectral characteristics of each signal may be measured individually to generate the initial and operating spectral signatures, or the signals may be combined (e.g., convolved) and the combined signal used to generate the initial and operating spectral signatures.

In an alternative embodiment, the initial and operating spectral signatures are generated by combining the spectral characteristic of the analog signal 24 generated by the channel 22 with the user authentication signal 28 provided by the host. In yet another embodiment, the initial and operating spectral signatures are generated by combining the spectral characteristic of the analog signal 20 generated by the electronic circuit 18, the spectral characteristic of the analog signal 24 generated by the channel 22, and the user authentication signal 28 provided by the host. In each of these embodiments, the initial spectral signature 8 is preferably generated in a secure environment during an initialization mode using the signal generator 10 within the device 2. The initial spectral signature 8 is then stored in the memory 6 and compared to the operating spectral signature 12 during normal operation of the device 2.

Figure 6A:
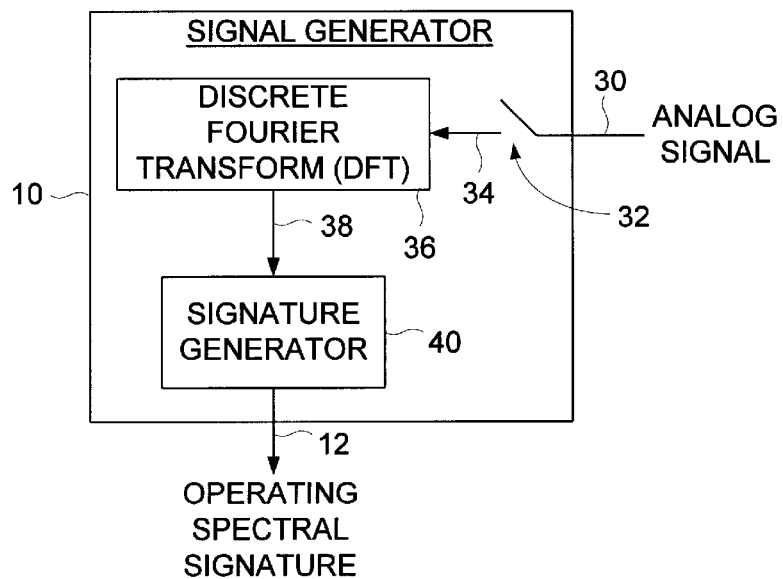
FIG. 6A shows details of an embodiment for the signal generator within the validation circuit of FIG. 1 comprising a discrete Fourier transform (DFT) converter for converting the sequence of sample values into a DFT signal and a signature generator, responsive to the DFT signal, for generating the operating spectral signature.

FIG. 6A shows an example embodiment of the signature generator 10 for use in generating the operating spectral signature 12 for the device 2. The analog signal 30 (e.g., from the electronic circuit 18 or the channel 22) representing the spectral characteristic of the device 2 is sampled by sampler 32 to generate a sequence of sample values 34. A discrete Fourier transform (DFT) converter 36 converts the sequence of sample values 34 into a DFT signal 38, and a signature generator 40, responsive to the DFT signal 38, generates the operating spectral signature 12. The signature generator 40 may, for example, comprise suitable discrete-time filters for extracting a spectral component or components from the DFT signal 38.

Figure 6B:
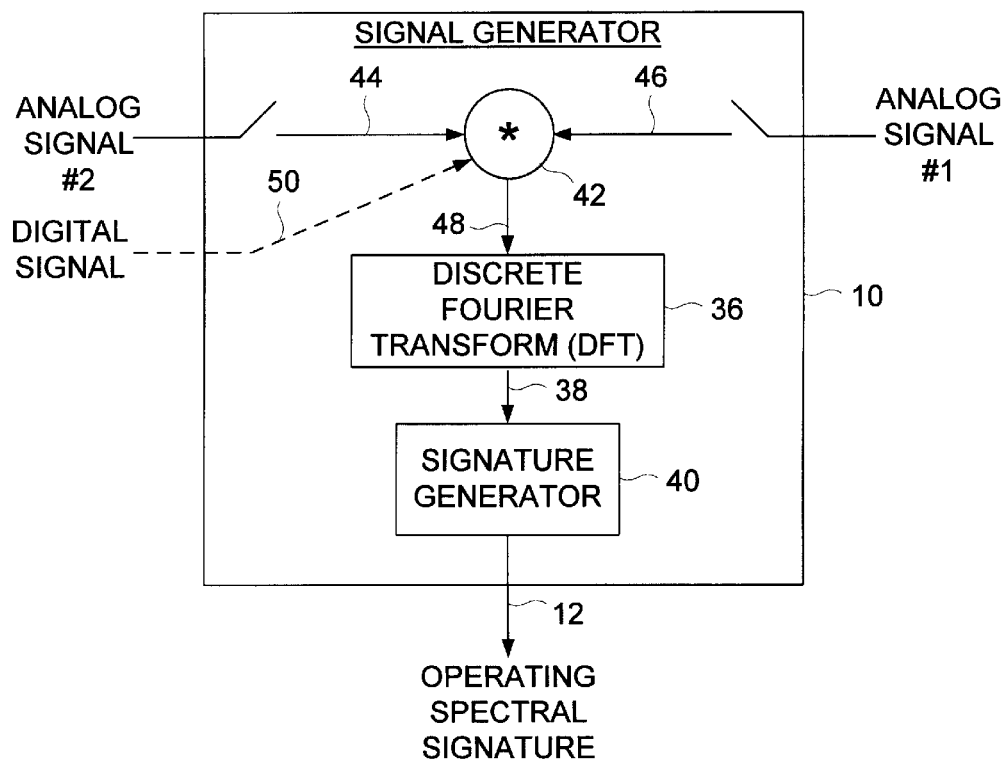
FIG. 6B shows details of an alternative embodiment for the signal generator within the validation circuit of FIG. 1 comprising a convolver for convolving a first signal with a second signal to generate a third signal, a means for generating a discrete Fourier transform (DFT) of the third signal to generate a DFT signal, and a signature generator, responsive to the DFT signal, for generating the operating spectral signature.

FIG. 6B shows an alternative embodiment for the signal generator 10 for use in generating the operating spectral signature 12 for the device 2. In this embodiment, the signal generator 10 is responsive to a plurality of signals representing a spectral characteristic or characteristics of the device 2. A convolver 42 convolves a first signal 44 with a second signal 46 to generate a third signal 48. The DFT converter 36 converts the third signal 48 into the DFT signal 38 which is converted into the operating spectral signature 12 by the signature generator 40. The first signal 44 may represent the analog signal 20 generated by the electronic circuit 18 and the second signal 46 may represent the analog signal 24 generated by the channel 22 as in the embodiment of FIG. 4.

The embodiment of the signal generator 10 shown in FIG. 6B shows that the first and second signals 44 and 46 are discrete-time signals generated by sampling respective analog signals. Alternatively, the first and second signals 44 and 46 are convolved using an analog convolver 42, and the resulting third signal 48 sampled. In yet another embodiment, the convolver 42 is responsive to a discrete-time signal 50; for example, the discrete-time signal 50 may represent the user authentication signal 28 of FIG. 5.

Signal processing techniques other than the Fourier transform may be employed by the signal generator 10 to generate the operating spectral signature 12 representing a spectral characteristic of the device. For example, parametric techniques such as autoregressive (AR) and autoregressive moving average (ARMA) modeling, or non-parametric techniques such as minimum variance and eigenspace methods, as well as Fractal, Wavelet, Maximum Entropy, or other mathematical theory could be employed to perform the spectral analysis in the signal generator 10. Thus, the phrase "spectral characteristic" as used herein is not limited to Fourier spectrum analysis.

I claim:

1. A device comprising:
    (a) encryption circuitry for encrypting plaintext data into ciphertext data;
    (b) a memory for storing an initial spectral signature representing an initial spectral characteristic of the device;
    (c) a signal generator for generating an operating spectral signature representing an operating spectral characteristic of the device; and
    (d) a comparator for comparing the operating spectral signature to the initial spectral signature, and enabling the encryption circuitry if the operating spectral characteristic substantially matches the initial spectral characteristic.

2. The device as recited in claim 1, wherein:
    (a) the device further comprises an electronic circuit; and
    (b) the initial and operating spectral signatures are generated by measuring a spectral characteristic of an analog signal generated by the electronic circuit.

3. The device as recited in claim 2, wherein the electronic circuit is a clock generator.

4. The device as recited in claim 2, wherein the electronic circuit is a power supply.

5. The device as recited in claim 1, wherein:
    (a) the ciphertext is output to a channel; and
    (b) the initial and operating spectral signatures are generated by measuring a spectral characteristic of an analog signal generated by the channel.

6. The device as recited in claim 1, wherein:
    (a) the device further comprises an electronic circuit;
    (b) the ciphertext is output to a channel; and
    (c) the initial and operating spectral signatures are generated by measuring a first spectral characteristic of a first analog signal generated by the electronic circuit and by measuring a second spectral characteristic of a second analog signal generated by the channel.

7. The device as recited in claim 2, wherein:
    (a) the device comprises an input for receiving the plaintext data from a host system; and
    (b) the initial and operating spectral signatures are generated by combining the spectral characteristic of the analog signal generated by the electronic circuit with a user authentication signal provided by the host.

8. The device as recited in claim 5, wherein:
    (a) the device comprises an input for receiving the plaintext data from a host system; and
    (b) the initial and operating spectral signatures are generated by combining the spectral characteristic of the analog signal generated by the channel with a user authentication signal provided by the host.

9. The device as recited in claim 1, wherein the signal generator comprises:
    (a) a sampler for sampling an analog signal generated by the device to generate a sequence of sample values;
    (b) a discrete Fourier transform (DFT) converter for converting the sequence of sample values into a DFT signal; and
    (c) a signature generator, responsive to the DFT signal, for generating the operating spectral signature.

10. The device as recited in claim 1, wherein the signal generator comprises:
    (a) a convolver for convolving a first signal with a second signal to generate a third signal;

(b) a means for generating a discrete Fourier transform (DFT) of the third signal to generate a DFT signal; and (c) a signature generator, responsive to the DFT signal, for generating the operating spectral signature.

11. The device as recited in claim 1, further comprising:

(a) a means for detecting tampering with the initial spectral signature; and (b) a means for rendering the encryption circuitry inoperable when tampering with the initial spectral signature is detected.

12. The device as recited in claim 1, further comprising:

(a) a means for detecting tampering with the comparator; and (b) a means for rendering the encryption circuitry inoperable when tampering with the comparator is detected.

13. A method of enabling encryption circuitry within a device, the encryption circuitry for encrypting plaintext data into ciphertext data, the method comprising the steps of:

(a) storing in a memory an initial spectral signature representing an initial spectral characteristic of the device;

(b) generating an operating spectral signature representing an operating spectral characteristic of the device; and (c) comparing the operating spectral signature to the initial spectral signature, and enabling the encryption circuitry if the operating spectral characteristic substantially matches the initial spectral characteristic.

14. The method as recited in claim 13, wherein:

(a) the device further comprises an electronic circuit; and (b) the initial and operating spectral signatures are generated by measuring a spectral characteristic of an analog signal generated by the electronic circuit.

15. The method as recited in claim 14, wherein the electronic circuit is a clock generator.

16. The method as recited in claim 14, wherein the electronic circuit is a power supply.

17. The method as recited in claim 13, further comprising the steps of:

(a) outputting the ciphertext to a channel; and (b) generating the initial and operating spectral signatures by measuring a spectral characteristic of an analog signal generated by the channel.

18. The method as recited in claim 13, wherein the device further comprises an electronic circuit, the method further comprising the steps of:

(a) outputting the ciphertext to a channel; and (b) generating the initial and operating spectral signatures by measuring a first spectral characteristic of a first analog signal generated by the electronic circuit and by measuring a second spectral characteristic of a second analog signal generated by the channel.

19. The method as recited in claim 15, wherein the device comprises an input for receiving the plaintext data from a host system, the method further comprising the step of generating the initial and operating spectral signatures by combining the spectral characteristic of the analog signal generated by the electronic circuit with a user authentication signal provided by the host.

20. The method as recited in claim 17, wherein the device comprises an input for receiving the plaintext data from a host system, the method further comprising the step of generating the initial and operating spectral signatures by combining the spectral characteristic of the analog signal generated by the channel with a user authentication signal provided by the host.

21. The method as recited in claim 13, wherein the step of generating the operating spectral signature comprises the steps of:

(a) sampling an analog signal generated by the device to generate a sequence of sample values;

(b) converting the sequence of sample values into a discrete Fourier transform (DFT) signal; and (c) generating the operating spectral signature in response to the DFT signal.

22. The method as recited in claim 13, wherein the step of generating the operating spectral signature comprises the steps of:

(a) convolving a first signal with a second signal to generate a third signal;

(b) generating a discrete Fourier transform (DFT) of the third signal to generate a DFT signal; and (c) generating the operating spectral signature in response to the DFT signal.

23. The method as recited in claim 13, further comprising the steps of:

(a) detecting tampering with the initial spectral signature; and (b) rendering the encryption circuitry inoperable when tampering with the initial spectral signature is detected.

24. The method as recited in claim 13, further comprising the steps of:

(a) detecting tampering with the step of comparing; and (b) rendering the encryption circuitry inoperable when tampering with the step of comparing is detected.

* * * * *